Oct. 1, 1968    E. L. BONIN ETAL    3,404,304
SEMICONDUCTOR JUNCTION DEVICE FOR GENERATING OPTICAL RADIATION
Filed April 30, 1964    3 Sheets-Sheet 1
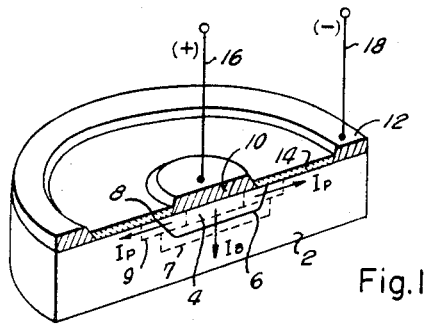
Fig.1
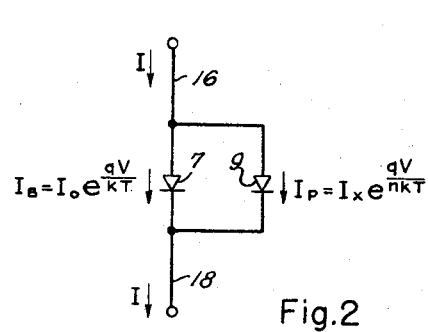
Fig.2
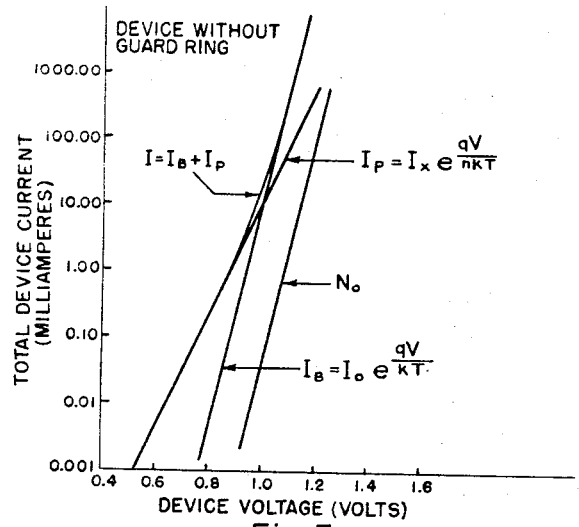
Fig.3
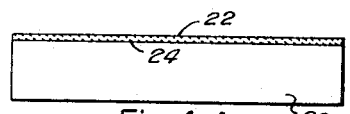
Fig.4-A
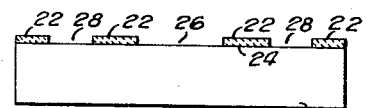
Fig.4-B
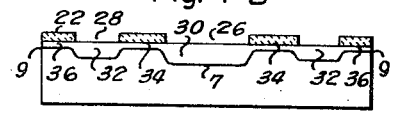
Fig.4-C
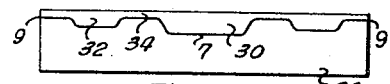
Fig.4-D
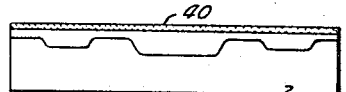
Fig.4-E
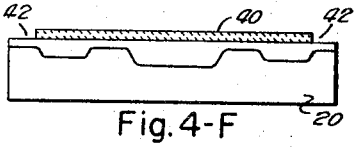
Fig.4-F
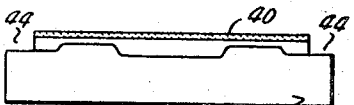
Fig.4-G
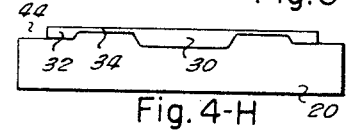
Fig.4-H
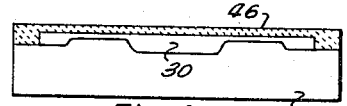
Fig.4-I
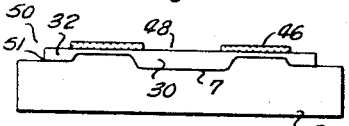
Fig.4-J
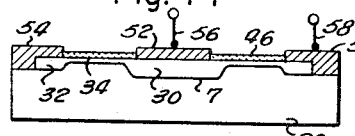
Fig.4-K
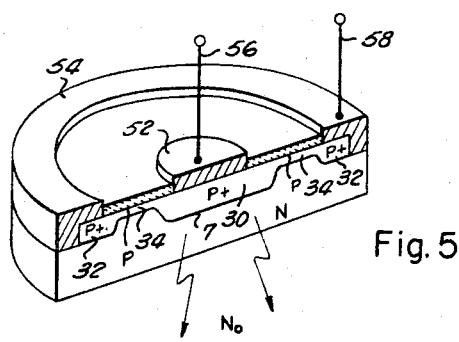
Fig.5
INVENTORS
Edward L. Bonin
Gary E. Pittman
Bruce S. Reed
BY Thomas A. Harwood
ATTORNEY Oct. 1, 1968  E. L. BONIN ETAL  3,404,304
SEMICONDUCTOR JUNCTION DEVICE FOR GENERATING OPTICAL RADIATION
Filed April 30, 1964  3 Sheets-Sheet 2
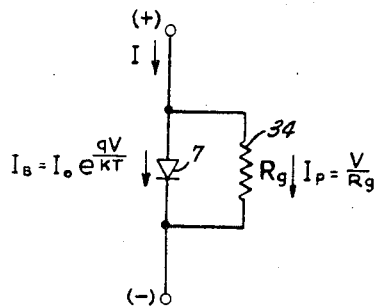
Fig. 6
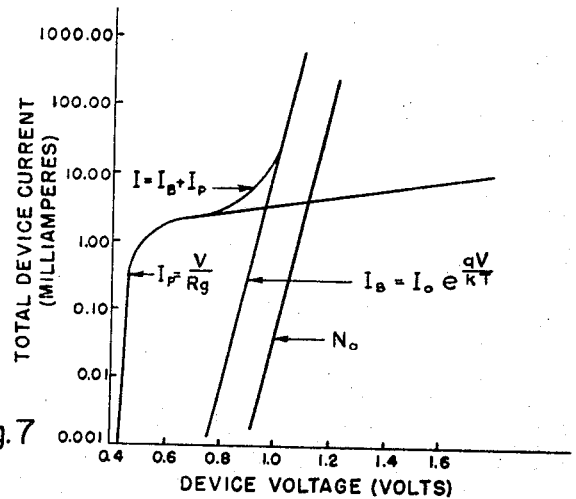
Fig. 7
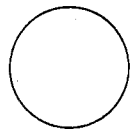
Fig. 8-A
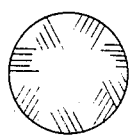
Fig. 8-B
Fig. 8-C
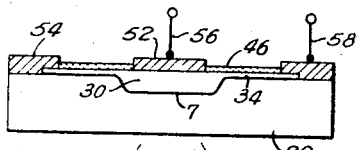
Fig. 9
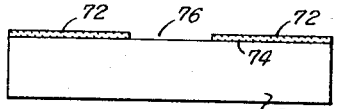
Fig. 10-A
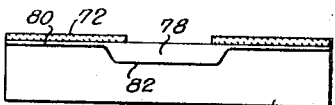
Fig. 10-B
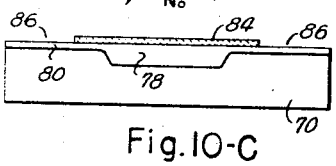
Fig. 10-C
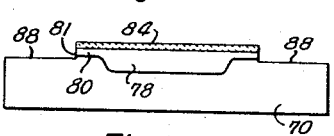
Fig. 10-D
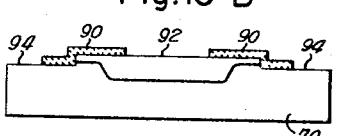
Fig. 10-E
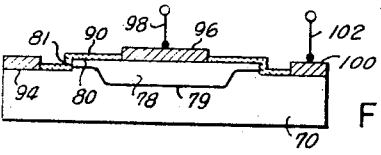
Fig. 10-F
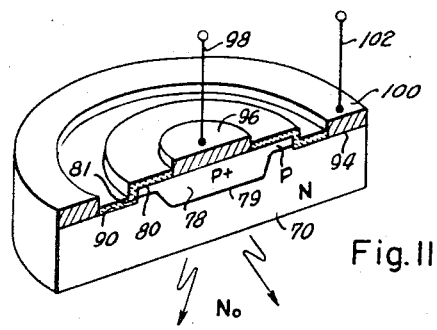
Fig. 11
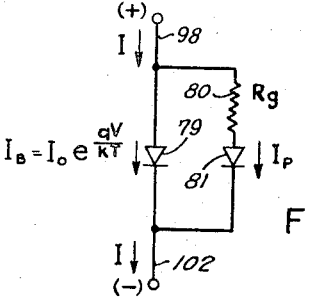
Fig. 12
INVENTORS
Edward L. Bonin
Gary E. Pittman
Bruce S. Reed
BY Thomas A. Harwood
ATTORNEY INVENTORS
Edward L. Bonin
Gary E. Pittman
Bruce S. Reed

ATTORNEY

United States Patent Office 3,404,304
Patented Oct. 1, 1968

3,404,304
SEMICONDUCTOR JUNCTION DEVICE FOR
GENERATING OPTICAL RADIATION
Edward L. Bonin, Richardson, and Gary E. Pittman and
Bruce S. Reed, Dallas, Tex., assignors to Texas Instruments Incorporated, Dallas, Tex., a corporation of
Delaware
Filed Apr. 30, 1964, Ser. No. 363,885
15 Claims. (Cl. 313—108)

This invention relates to semiconductor devices and more particularly to an improved semiconductor junction device which generates optical radiation in response to an electric current flow across the junction thereof.

A device of the general type of which this invention constitutes an improvement is described, among other sources, in the copending application of Biard et al., entitled Semiconductor Device, filed Aug. 8, 1962, Ser. No. 215,642 and now Patent No. 3,293,513. Such a device is comprised of the semiconductor material galliumarsenide (GaAs) and contains a rectifying junction across which an electric current flow causes the generation of optical radiation in the infrared region. The theory of operation of the light source is the generation of electron-hole pairs created by forward current flow across the junction of the device, and the recombination of electron-hole pairs produces photons whose energy is in the infrared region with a narrow bandwidth of maximum intensity of about .9 micron wavelength. Light sources of this type are much more useful in most electronic applications than are conventional light sources for many reasons. As examples, the solid state nature of the device lends itself readily to simplicity, miniaturization and high reliability. Moreover, the light output intensity can be modulated at a very high frequency by modulating the current flow to the device.

The invention provides improvements in devices of the type generally described above in at least two areas of major consideration. The first of these is the quantum efficiency of the device defined as the ratio of the number of photons of light generated to the number of units of electrical current supplied to the device. From this, improvements in the operating characteristics of the device are achieved, and in particular, more light quantity as a function of current is generated at low current levels. Secondly, and at least equally important, time degradation of the device characteristics is virtually eliminated, and in particular, the amount and quality of light output remains constant for the same current input over an indefinite operating lifetime. The importance of each of these considerations is apparent. In the application of such a device to miniature circuits, for example, the efficiency can play a vital role where only small amounts of electrical power can be used. Moreover, the shape of the input current versus light output curve is important, and by improving the efficiency at low operating currents, the degree of linearity of the curve is improved. And, of course, serious degradation of the quality of the device characteristics as a function of operating lifetime precludes its continued use.

The efficiency and linearity shortcomings at low current levels for a device of this type were both observed to be related to some current loss mechanism, wherein a portion of the total current supplied to the device apparently was unproductive of light generation. However, the exact current mechanism to which these effects should be attributed was not known. The degradation effect observed in devices of this type, however, was not observed to be related to any particular current loss mechanism, to which it was attributed only after the improvement made by the present invention. In all cases, the particular current loss mechanism was not understood until these improvements were made.

These improvements are achieved in the present invention by providing a device in which virtually all of the current supplied thereto flows across what will be termed the active junction thereof, so that all of the current is productive of light generation. This implies, as will be described in detail later, that there exists a portion of the junction which is inactive at least insofar as light generation is concerned. Moreover, and unexpectedly so, reduction or elimination of current flow across the so-called inactive portion of the junction improves the characteristic of light output degradation as a function of operating lifetime. In one embodiment of the invention, a high impedance to current flow across this inactive portion of the junction is provided in the improved device, and in another embodiment, the current flow across the inactive portion is completely eliminated. As will be seen later, the efficiency and linearity is greatly improved in the one case in addition to greatly reducing the degradation effect, whereas in the second embodiment, the degradation effect is substantially reduced and is eliminated for all practical purposes for most applications.

All of the above features and advantages, in addition to others, will become apparent from the following detailed description of the invention when taken in conjunction with the appended claims and the attached drawing wherein like reference numerals refer to like parts throughout the several figures, and in which:

FIGURE 1 is a perspective view in elevational section of a galliumarsenide semiconductor junction light source without the structural features of the invention which eliminate the peripheral current flow, and is shown for purposes of illustrating the detrimental effects of the peripheral current flow;

FIGURE 2 is an electrical schematic diagram of the equivalent electric circuit of the device of FIGURE 1;

FIGURE 3 is a graphical representation of the total current flowing through the device of FIGURE 1 as a function of the voltage applied thereacross;

FIGURES 4A–4K are elevational views in section illustrating the process by which one embodiment of the invention is made;

FIGURE 5 is a perspective view in elevational section of the embodiment fabricated according to the preceding FIGURES 4A–4K;

FIGURE 6 is an electrical schematic diagram of the equivalent electric circuit of the device of FIGURE 5;

FIGURE 7 is a graphical representation of the total current flowing through the device of FIGURE 5, shown on a log scale, as a function of the voltage applied thereacross, shown on a linear scale;

FIGURES 8A–8C are plan views of the light emitting surface of the device of FIGURE 1 illustrating the light output degradation as a function of operating lifetime;

FIGURE 9 is an elevational view in section of a variation of the embodiment shown in FIGURE 5;

FIGURES 10A–10F are elevational views in section illustrating the process by which another embodiment of the invention is made;

FIGURE 11 is a perspective view in elevational section of the embodiment fabricated according to the preceding FIGURES 10A–10F;

FIGURE 12 is an electrical schematic diagram of the equivalent electric circuit of the device of FIGURE 11;

Figure 13:
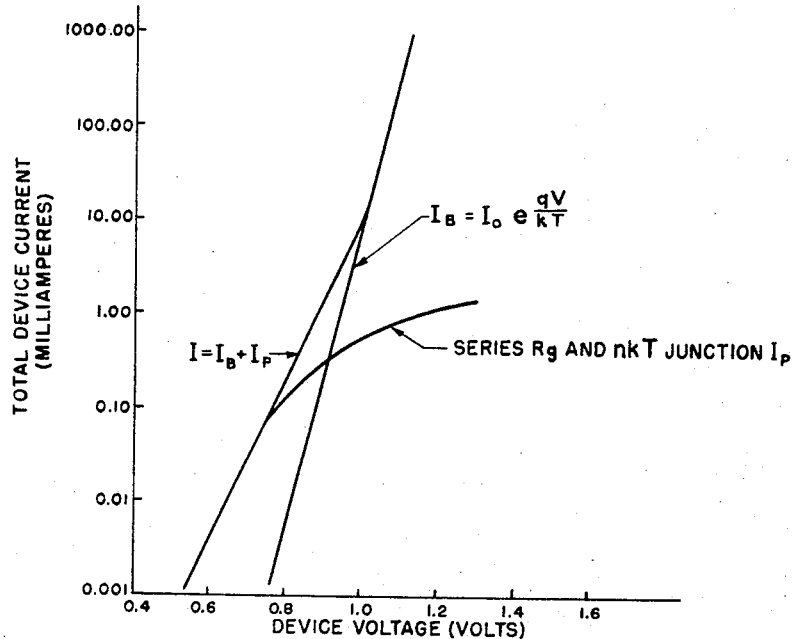
FIGURE 13 is a graphical representation of the total current flowing through the device of FIGURE 11 as a function of the voltage applied thereacross.

In order to more clearly understand the invention, it is believed that the following discussion relating to some of the current characteristics of semiconductor junction devices will be helpful. All semiconductor junction devices are characterized by the fact that a junction or transition region located within the device intersects one or more surfaces of the device. It has been found that, in some cases, the junction at or near the surface which it intersects acts electrically quite different from the main portion of the junction located within the bulk of the semiconductor material. It is theorized that some form of "surface states" are created at the surface and within a shallow region underlying where the junction intersects the surface, which yields a different voltage-current junction characteristic than that observed for the major portion of the junction located within the bulk of the semiconductor. Moreover, surface currents can flow across the junction at the surface-junction intersection to alter the junction characteristics. Regardless of the actual cause or theory of the surface current and the current flow across the portion of the junction which is effected by the so-called surface states, the fact remains that one or both of the currents exist in some semiconductor materials and reduce the efficiency of the device. When this is the case, the electrical characteristics of the device are different from that which it should theoretically have. For example, in silicon and germanium junction transistors, an alteration of the base-emitter junction characteristics where it intersects the surface of the device has been considered the reason for the reduction in the gain of the transistor at low emitter currents. To reduce or eliminate this effect in silicon and germanium devices, a layer of silicon-dioxide is formed on the surface where the junction exists and has been found to be effective in protecting the junction from contamination, and prevents the "surface states" from being created. It has been concluded from all of the above that if surface currents of this nature exist, the portion of the junction across which this current flows is inactive to produce or contribute to the operation of the device, and consequently represents a current loss.

In addition to the above problem, which has been recognized for some time in silicon and germanium junction devices, there has also been recognized that current flow across the "active" portion of the junction located within the bulk of the semiconductor contains a component whose magnitude varies differently as a function of voltage than does the major current flow responsible for the operation of the device. It has been concluded that this effect is insignificant in relation to both the surface current effect and the bulk current flowing across the active portion of the junction for silicon and germanium devices. Initially, however, this was not known to be the case, and consequently, the reason for the fall-off of transistor gain at low emitter currents, for example, was not understood. The bulk component effect which represents a current loss was first predicted by William Shockley, and his theory states that the larger the band-gap energy of a semiconductor material, the larger is the effect of the bulk current loss component, all other things being equal. This, taken in conjunction with the fact that both the Shockley bulk current and the surface current are expressed mathematically by the same general equation, which is different from the desired bulk current, leads to the conclusion that it is virtually impossible to predict which loss effect is predominant without suitable experimentation. Specifically, the bulk current $I_B$, to which the desired operation of the device is attributed, is expressed by the equation (1) $$I_B = I_o e^{qV/kT}$$

where $I_o$ is a constant, $q$ is the electronic charge, V is the voltage across the junction, $k$ is Boltzmann's constant and T is the absolute temperature, wherein this current is usually referred to as the $kT$ current. Both the surface current $I_P$ and the Shockley bulk current component $I_B'$ are represented by a general equation (2) $$I_x e^{qV/nkT}$$

where $I_x$ is another constant and $n$ is a number greater than unity, although $I_x$ and $n$ are ordinarily different for $I_P$ and $I_B'$, both these currents are usually referred to as an $nkT$ current. Thus, by observing the current-voltage characteristics of a device, it is possible to determine whether there exists an $nkT$ current component in addition to the $kT$ current. It is not possible, without additional information, to determine the location where, in relation to the junction, the $nkT$ component is most predominant.

The light source of this invention is comprised of gallium-arsenide, and it has been found that the current passing through the device when a voltage is applied across the junction is comprised of at least two components, one being expressed by Equation 1 above, and the other being expressed by Equation 2 above. It should be noted, however, that the band-gap for gallium-arsenide is considerably larger than for either silicon or germanium, which tends to lead to the conclusion that the $nkT$ bulk current component is considerably larger in relation to the $nkT$ surface current component than for either silicon or germanium. However, it has been found that the $nkT$ bulk current component is insignificant except at extremely small operating currents, and that reduction or elimination of the $nkT$ surface current component effected a considerable efficiency gain and provided a device which generates a greater quantity of light per unit of current input at low current levels in addition to a more linear current versus light relation. In addition to this, it has been unexpectedly observed that the light output degradation as a function of operating lifetime has been substantially reduced, and in one embodiment of the invention, the degradation effect has been eliminated. This last effect is extremely important since considerable degradation in the characteristics of a device precludes its reliable use, although it is still not understood why the degradation is eliminated in this device.

Unlike silicon and germanium junction devices, a layer of silicon-dioxide overlying the junction of a gallium-arsenide device where the junction intersects the device surface does not prevent the $nkT$ surface current component. This is a result of the pecularity of gallium-arsenide as compared to silicon and germanium. To reduce the $nkT$ component in one embodiment of the present invention, a high impedance is imposed to the $nkT$ current flow. Since the $nkT$ surface current component exists at the periphery of the junction, or where the junction intersects the surface of the device, the problem resolves itself into the provision of a high impedance to current flow between the active and inactive portions of the junction, and specifically, takes the form of a high impedance region surrounding the active portion of the junction. In another embodiment, the inactive portion of the junction is electrically shorted in addition to providing a high impedance to current flow between the active junction region and the electrically shorted inactive junction region. In the first case, only a small amount of peripheral current flows as compared to the current which would otherwise flow, thus substantially increasing the efficiency and gain of the device at all current levels. In the second case, current flow through the inactive junction region is completely eliminated by means of the electrical short thereacross, which substantially reduces the degradation effect, and for all practical purposes, any degradation effect persisting is insignificant. Moreover, it will be seen that the provision of the high impedance region is made possible by the diffusion technology utilized in forming the junction within a gallium-arsenide device, which is peculiar to the semiconductor gallium-arsenide.

Referring now to FIGURE 1, there is shown a perspective view in elevational section of a gallium-arsenide junction device which generates optical radiation according to the above-noted Biard et al., copending application, but without the improvements of the present invention. A single crystal wafer 2 of gallium-arsenide, usually of n-type conductivity, has diffused into one face thereof a region 4 of p-type conductivity which is highly doped and of higher electrical conductivity than the original wafer 2. The region 4 is denoted by P+ because of its high conductivity. The boundary between the two regions 2 and 4 is the junction 6 or transition region which extends to and intersects the surface 8. In this particular case, the junction is of circular configuration, and the line of intersection between the junction and the surface 8 defines a circle. For purposes of illustration only, the dashed enclosure 7 encircles the active portion of the junction situated within the bulk of the body and which is parallel to the surface of the device. An annular portion of the junction enclosed by the dashed enclosure 9, which includes the portion of the junction intersecting the surface of the device and a portion extending into the bulk of the body, will be referred to as the peripheral portion of the junction. The $k$T bulk current $I_B$ flows across the active portion of the junction as noted earlier, whereas the $nk$T peripheral current $I_P$ flows across the region 9. The $nk$T bulk current component $I_B'$ also flows across region 7. An ohmic contact 10 is provided to the region 4, and similarly, an annular ohmic contact 12 is provided to the region 2. Electrodes 16 and 18, respectively, are provided to the two ohmic contacts, and a voltage applied between the two contacts causes a current flow through the junction, whereby the $k$T current $I_B$ is effective in generating optical radiation shown schematicaly as $N_o$. A layer of silicon-dioxide 14 is usually provided on the surface of the device between the contacts during the fabrication thereof to provide some degree of protection for the junction where it intersects the surface of the device, although this protection is inadequate to reduce the peripheral current flow to any considerable degree.

The equivalent circuit of the device of FIGURE 1 is shown in the electrical schematic diagram of FIGURE 2, and comprises two diodes 7 and 9 in parallel with each other, since a part of the total current input flows through the peripheral junction portion 9 and is governed by Equation 2 above, and the rest of the total current input flows through the active junction portion 7 and is governed by Equation 1 above. The two current components $I_B$ and $I_P$ recombine to flow out the electrode 18 to give the equivalent circuit as shown.

The current-voltage characteristics of the device of FIGURE 1 is shown in the graphical representation of FIGURE 3, wherein the total diode current in milliamperes is shown on a logarithmic scale along the ordinate of the graph and the diode voltage in volts is shown on a linear scale along the abscissa. The voltage-current characteristic of diode 9 is a straight line denoted by $I_P$, whereas the characteristic of diode 7 is also a straight line denoted by $I_B$ but with a different slope. Since the current $I_B$ is the only component which is effective in generating light within the device, it is obvious that the desired characteristic, or what will be referred to as the ideal characteristic, is the $I_B$ curve. However, it has been found that the device of FIGURE 1, exhibits both components, and to obtain the overall characteristic curve of the device, the two currents are added to give the characteristic curve I, which is equal to the addition of $I_B$ and $I_P$, as shown. It will be noted that at low voltages, the total current of the device follows the $I_P$ curve, whereas at higher voltages, the current follows the $I_B$ curve. At sufficiently high currents, say above 100 milliamperes, the composite curve breaks over to the right because of the bulk series resistance of the device, which is of no consequence here. It can be seen, thus, that at least one effect of the peripheral current $I_P$ is to preclude generation of substantial optical radiation at low currents. Also shown in the graph of FIGURE 3 is the characteristic curve of the light output $N_o$ as a function of the voltage across the diode. Since the current $I_B$ generates the light output $N_o$ and the two are proportional, the curve $N_o$ is parallel to the curve $I_B$. Thus, if the ideal current $I_B$ is shown graphically as a function of the light output, a linear relation will result as will be shown later. However, due to the existence of the current component $I_P$, the light output $N_o$ is not a linear function of the total current to the device.

Referring to FIGURES 4A–4K, which illustrates the method by which one embodiment of the invention is fabricated, elevational views in section of a wafer of gallium-arsenide semiconductor material is shown during the various stages of fabrication of the device. Initially, a thin coating of silicon dioxide 22 is deposited in a surface 24 of a single-crystalline gallium-arsenide wafer 20, which is usually of n-type conductivity. The surface 24 is usually polished prior to the depositing of the silicon-dioxide layer, and the silicon-dioxide layer is deposited by any suitable means, such as by reactively sputtering, for example, or depositing the silicon-dioxide from the vapor state by the pyrolytic decomposition of a suitable organic compound. All of such processes are well known and will not be described here. After the oxide layer has been deposited, a photographic masking and etching technique is used to remove selected portions of the oxide to permit the diffusion of an impurity into the wafer. For purposes of illustration, the wafer is considered to be circular in geometry with the section views of the figures being taken across the diameter of the wafer. A circular opening 26 is cut in the oxide at the center of the wafer as shown in FIGURE 4B, and an annular ring 28 is cut in the oxide near the periphery of the wafer surrounding the opening 26. The photographic technique used is well known in the art and comprises masking of that portion of the oxide that is to remain on the surface and etching away the remainder of the oxide with a suitable etch that attacks the oxide but not the gallium-arsenide wafer. Once the oxide has bene selectively removed as shown in FIGURE 4B, the wafer is then sealed in a quartz ampule with an appropriate impurity, such as zinc or zinc-arsenide (ZnAs$_2$), as examples, and heated to a temperature of about 900 degrees centigrade for about four minutes. This causes the impurity to diffuse into the wafer beneath the openings in the oxide to a depth of about 0.3 mil. The impurity determines p-type conductivity when diffused into an n-type semiconductor and thus a p-type conductivity region 30 is formed beneath the opening 26 and is separated from the original n-type conductivity wafer by a rectifying junction 7. Similarly, an annular region 32 is formed beneath the annular opening 28, and is also of p-type conductivity. Actually, the regions 30 and 32 are converted to relatively high conductivity p-type regions, and are more aptly denoted by a P+ region, which indicates that these regions are of a substantially higher conductivity than the original wafer.

Unlike other impurities which are normally used in conjunction with silicon and germanium semiconductors, the zinc or zinc-arsenide diffuses through a silicon-dioxide layer, whereas the normal impurities used with silicon and germanium are blocked by a silicon-dioxide layer. Thus, the diffusant penetrates through the oxide coating to form thin annular p-type conductivity channel regions 34 and 36 underlying the oxide. The effect of the oxide layer, however, is to greatly reduce the surface concentration of the impurity at the wafer surface beneath the oxide layer as contrasted to the relatively high surface concentration of the impurity at the surface of the wafer coinciding with the openings. As a result, the diffused regions beneath the oxide layer have a relatively low electrical conductivity. The channel regions are very thin according to the above-described diffusion process and are on the order of about 1 micron, or .04 mil in depth.

The oxide is removed from the surface of the wafer after the various regions have been diffused, as shown in FIGURE 4D, and a new layer of silicon-dioxide, which covers the entire surface, is deposited as shown in FIGURE 4E. Subsequently, an annular opening 42 is removed in the oxide at the periphery of the wafer to expose the thin annular diffused region 36 and a small segment of the deep annular region 32, as shown in FIGURE 4F. The wafer is then immersed in an etch which does not attack the silicon-dioxide coating but which etches away the exposed portions of the wafer beneath the opening 42. The wafer is left in the etch for a time just sufficient to etch below the junction between the region 36 and the original wafer to expose an n-type conductivity surface 44 as shown in FIGURE 4G. Again, the oxide layer 40 is removed as shown in FIGURE 4H so that a new layer 46 can be deposited as shown in FIGURE 4I, and subsequently, a circular opening 48 is cut in the oxide layer to expose the central region 30. Also, an annular opening 50 is cut in the oxide to expose the periphery of the wafer and a portion of the annular P+ region 32, all as shown in FIGURE 4J. The device, in this configuration, contains a rectifying junction which intersects the surface 44 of the wafer at the location 51. Finally, metal contacts are provided to the surfaces of the device exposed through the openings in the oxide. As examples, an alloy comprised of 4% zinc and 96% gold is evaporated on and alloyed to the surface of region 30 to form an ohmic contact 52 therewith. An alloy comprised of 0.6% antimony and 99.4% gold is evaporated on the surface exposed through opening 50, subsequently plated with nickel and alloyed to form a single annular ohmic contact 54 to both the original n-type conductivity wafer surface 44 and P+ region 32, thus electrically shorting the two. Electrodes 56 and 58 are then welded to the contacts 52 and 54, respectively. The junction-surface intersection 51 is actually an extension of the central active junction 7 and represents the inactive junction region through which the undesired peripheral current will flow unless prevented. However, contact 54 shorts this inactive junction region, and any current tending to pass through the junction at this point is shunted through the contact. The active bulk junction 7 is not shorted, however, and is isolated from the contact 54 through the high resistance annular channel region 34. All of this is more clearly shown in the perspective view of the completed device shown in FIGURE 5, which is also a sectional view in elevation across the diameter of the wafer. As will be shown later, only a very small percentage of the total current supplied to the device flows through the channel 34.

The equivalent circuit of the device of FIGURE 5 is shown in the electrical schematic diagram of FIGURE 6, and comprises the active junction 7 between the central region 30 and the original wafer 20 connected in parallel with a resistance $R_g$, which is the equivalent resistance of the channel 34 between the contact 54 and the active junction region 30. No peripheral junction exists because of the fact that it is shorted by contact 54. The current through the diode 7 is the ideal or bulk current $I_B$ governed by Equation 1 above, whereas the current through the resistance $R_g$ which will now be referred to as the peripheral current, $I_P$, is equal to $V/R_g$, where V is the voltage across the diode. It should be remembered, however, that the peripheral current is different from that flowing through a junction at the periphery of the device.

The voltage-current characteristics of the device of FIGURE 5 are also shown in the graphical representation of FIGURE 7. The current flow through the parallel resistance, $R_g$, or that passing through the narrow channel region 34 in parallel with the junction 7, is designated on the graph as $I_P$ and varies linearly as a function of the diode voltage. At very low voltages most of the current supplied to the diode of FIGURE 5 passes through the parallel resistance $R_g$. However, for a voltage across the diode of about .8 to 1.0 volt, almost all of the current supplied to the device flows through the diode junction 7. The composite current curve of the equivalent circuit of FIGURE 6 is denoted as $I=I_B+I_P$. It can be seen from these curves that the ideal $kT$ characteristic curve is attained at about the same current level for the improved device as for the unimproved device of FIGURE 1. However, the departure of the curve from the $kT$ characteristic at low currents is because of the resistance $R_g$ and not because of a peripheral $nkT$ current flow.

The foregoing graph illustrates the electrical characteristics for the unimproved and improved devices having substantially identical dimension and parameters except the high resistance channel region and shorted contact of the latter. As a specific example of dimensions and parameters for the improved device, the diameter of the active P+ region 30 is usually made to about 5 mils, and the inside diameter of the deep annular region 32 is made to be about 50 mils. This yields an annular channel region 34 whose lateral dimension is about 45 mils. The above diffusion process produces a channel region whose sheet resistance is about 1000 ohms/square, so that the resistance of the channel region is about 300 ohms.

The main advantage of the embodiment shown in FIGURE 5 is the fact that not current passes through the inactive portion of the junction where it intersects a surface of the device, and as a consequence thereof, it has been found, unexpectedly so, that the lifetime characteristics are markedly improved. The degradation effect substantially reduced here is shown pictorially in FIGURES 8A–8C, wherein FIGURE 8A illustrates, in plan view, the surface of a light emitting device through which the light is emitted, such as the surface of the device of FIGURE 1 opposite the electrical contact 10. FIGURE 8A represents that light is being uniformly emitted over the entire device surface during its initial operation. After several hours of operation, however, dark lines or striations begin to appear at the edge of the light emitting surface with these lines being disposed at various 60° angles to each other as shown in FIGURE 8B. These angles, it is believed, correspond roughly to the crystalline structure of the gallium-arsenide wafer, and by quantitative measurements, it has been found that the total light output has decreased for the same current input. After further operation, the dark lines progress in length and number and eventually extend over the entire diameter of the wafer and occupy a substantially large portion of the surface area, such as illustrated in FIGURE 8C. It can be quite readily concluded that the part of the wafer surface occupied by the dark lines does not emit light and it is believed that corresponding portions of the rectifying junction within the wafer have become inactive to light generation, thus representing a current loss. The reason for the occurrence of this effect is not completely understood, and prior to the invention, no plausible reason or cause could be established. It is apparent that a device exhibiting a deteriorating effect of this nature is limited in its reliable application to circuitry.

Observing the quantity of light output for constant currents as a function of operating lifetime for a device having means of eliminating current flow through the inactive peripheral junction portion, such as the improved embodiment just described, indicates that the dark lines do not appear and that the light output remains constant. This is clearly an unexpected and desirable result. It is highly desirable since its operating parameters (light output) remain the same function of current over an indefinite operating lifetime. Evidently, the $nkT$ current flow at the junction periphery is the cause of the deterioration effect, and eliminating this $nkT$ current precludes any onset of degradation. The fact that the device does not generate any more light at lower current levels than the unimproved device is relatively unimportant, since the device of FIGURE 5 is used primarily for high current (and thus high power) applications. It can be seen from the graph that at high currents, the current follows the $k$T characteristic curve. To improve the efficiency of the device at lower current levels, only the magnitude of $R_g$ need be increased.

A variation of the embodiment of FIGURE 5 is shown in the elevational view in section of FIGURE 9. This device has the same electrical characteristics as the improved embodiment just described, but is somewhat simpler to fabricate. In the preceding embodiment, the provision of the deep annular P+ region 32 is for the purpose of facilitating an ohmic connection to the narrow channel region 34. That is, it is easier to make an ohmic connection to the high conductivity P+ region than the high resistivity region 34. However, such connections can be made to provide the device shown in FIGURE 9 with the metal contact 54 connected directly to the channel region 34 and the n-type wafer 20. Thus, some of the steps of the fabrication process are eliminated, such as obviating the necessity of a photographic mask with an annnular opening and the provision of the deep P+ region 32.

A different embodiment of the invention will now be described which has better efficiency characteristics than the previous embodiment, has more linear operation between the light output and current input at low current levels, and which greatly reduces the light output degradation effect alluded to. Referring now to FIGURES 10A–10F, which shows a gallium-arsenide wafer during the various stages of fabrication of the embodiment, a layer 72 of silicon-dioxide is deposited onto the surface of a gallium-arsenide single crystal wafer 70, and masking and etching techniques are used to provide a circular opening 76 in the oxide layer, as shown in FIGURE 10A. The wafer is then diffused with a suitable impurity, all as previously described, to provide a P+ region 78 beneath the opening 76 which forms a rectifying junction 82 with the n-type conductivity gallium-arsenide wafer 70, as shown in FIGURE 10B. The impurity also penetrates through the silicon-dioxide layer 72 to form a very thin diffused channel region 80 having an annular configuration surrounding the circular P+ region 78. Again, the region 80 is of p-type conductivity but has a very high resistivity. The oxide layer 72 is then removed and a new layer is deposited over the entire surface of the wafer. Subsequently, a portion of the silicon-dioxide coating is selectively removed to provide an annular opening 86 exposing a portion of the channel region 80, all as shown in FIGURE 10C. The remaining oxide layer covers the entire P+ region 78 and a portion of the channel region 80. The wafer is then etched down below the junction formed between the channel region 80 and the wafer 70 as shown in FIGURE 10D, with the silicon-dioxide coating 84 protecting the wafer therebeneath from being attacked by the etch. Thus, a portion of the channel region is removed and a portion remains the latter which is contiguous with the P+ region 78. Subsequently, the oxide layer 84 is again removed, another layer deposited on the entire surface of the wafer and the oxide layer is selectively etched to provide a central opening 92 in the layer whose diameter is slightly less than the diameter of the P+ region 78 and which exposes most of this region. Moreover, an annular opening 94 is provided at the periphery of the wafer which surrounds both the P+ region and the channel region 80, but which does not extend to the channel 80, all as shown in FIGURE 10E. Finally, suitable metallic contacts 96 and 100 are formed into the P+ region 78 and n-type wafer at the periphery of the wafer, respectively, as shown in FIGURE 10F, with electrodes 98 and 102 being connected to the contacts 96 and 100, respectively.

The device of this embodiment, as more clearly shown in the perspective view of FIGURE 11, contains an active junction 79 formed between the central P+ region 78 and the wafer 70. Moreover, the junction intersects the surface 81 of the device at the periphery of the annular channel region 80. However, any current flow across the peripheral junction region is impeded by the high resistance of the channel region 80, just as in the previous embodiment, although in this case, the peripheral junction region is not electrically shorted.

The electrical equivalent circuit of this embodiment is shown in the schematic diagram of FIGURE 12, and comprises a diode 79, which is the equivalent of the active junction region, and connected in parallel therewith is the series combination of the equivalent resistance $R_g$ of the channel region 80 and the peripheral diode region 81. The operation of the device can best be described in conjunction with the graphical representation of FIGURE 13, which illustrates the total device current, shown along the logarithmic scale of the ordinate, as a function of voltage along the linear scale of the abscissa. At low voltages, the total current through the device is controlled by diode 81. That is, at small enough voltages at the impedance of diode 81 is large as compared to resistance $R_g$, but is small as compared to the impedance of diode 79. As the voltage across the device increases, the impedance of diode 81 becomes less and the increase in voltage appears across resistance $R_g$ until, at higher voltages, the increase in voltage is seen across diode 79. This all occurs at low voltages and very low currents, such as, for example, between currents of 0.1 ma. to about 1.0 ma. as shown in FIGURE 13. Above about 1.0 ma., the device acts as if it comprised only the ideal $k$T current. It will be noted that the current level at which the device current starts to follow the ideal $k$T current curve is much lower than for either the unimproved device of FIGURE 1 or the previous embodiment. This results from the series combination of diode 81 and resistance 80. Thus, the efficiency improvement at low currents is much more substantial than the other embodiment. Although some peripheral current flows through diode 81, it is insignificant to that which flows through the unimproved device of FIGURE 1, and thus, degradation effects are greatly reduced.

Figure 14:
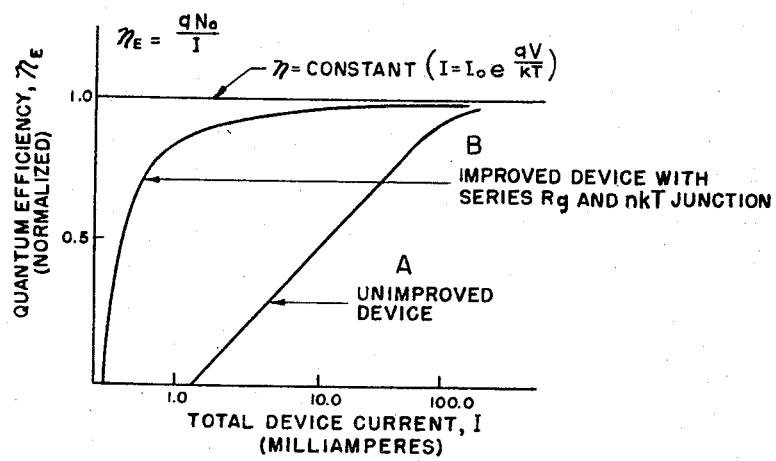
FIGURE 14 is a graphical representation of the quantum efficiency in terms of the light output as a function of the current through the device.

To further illustrate the efficiency improvement, the quantum efficiency, $n_E$, as a function of the total diode current in milliamperes is shown in the graphical representation of FIGURE 14, where the quantum efficiency is shown on a normalized scale and the device current is plotted on a logarithmic scale. Here, the quantum efficiency is defined as the ratio of the quantity of light output to the total number of units of electric current supplied to the device. Assuming an ideal case where the only current passing through the device is the $k$T bulk current through the active junction portion, there will be a constant relation between the quantity of light generated and the amount of input current, designated as $n$=constant on the graph. In such a case, the light output will vary linearly with the current through the diode. The efficiency as a function of the total current for the device of FIGURE 1 is shown at A in the graph, where it can be seen that the total current through the device must reach a substantial value, say about 100 milliamperes, before the efficiency approaches that for the ideal case. The efficiency curve as a function of total current for the improved embodiment just described is shown at B in the graph, where it is apparent that the efficiency is substantially improved at all current levels and reaches about half that of the ideal case at a current less than one milliampere.

Figure 15:
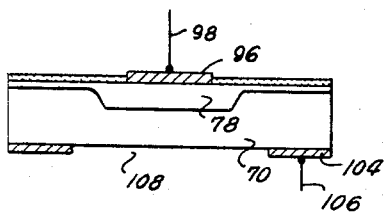
FIGURE 15 is an elevational view in section of a variation of the embodiment shown in FIGURE 11.

A variation of the embodiment just described is shown in FIGURE 15, whereby the channel region extends all the way to the side of the wafer. Instead of contact 100 being made to the top of the wafer as shown in FIGURE 11, an annular contact 104 is provided to the bottom of the n-type conductivity wafer at the periphery thereof, and the light generated within the device is emitted through the opening 108 surrounded by contact 104. Otherwise, the device is electrically equivalent to the device just described.

The invention has been described with reference to particular embodiments, which illustrate some of the features and advantages thereof. It is to be understood, however, that many other advantages and features, including modifications and substitutions, will become apparent to those skilled in the art, all of which is deemed to fall within the scope of the invention as defined in the appended claims.

What is claimed is:
1. A semiconductor device comprising:
   (a) a body of gallium-arsenide having a first zone of one conductivity type and a second zone of an opposite conductivity type contiguous to and forming a rectifying junction with said first zone, having means for emitting photons in the optical region of the electromagnetic spectrum when forward biased, and having a portion of its major face opposite a first region defined in (b) unobstructed by any material that will not transmit said photons,
   (b) said second zone defining a first inner, low resistivity region spaced from the periphery of said rectifying junction and a second high resistivity region laterally surrounding said first region and separating said first region from said periphery,
   (c) a first electrical contact to said first region of said second zone,
   (d) a second electrical contact to said first zone and electrically shorting said second region of said second zone to said first zone, and
   (e) means attached to said first and second electrical contacts for forward biasing said rectifying junction.

2. A semiconductor device comprising:
   (a) a body of gallium-arsenide having a first zone of one conductivity type and a second zone of an opposite conductivity type extending into said body from a surface thereof and forming a rectifying junction with said first zone, having means for emitting photons in the optical region of the electromagnetic spectrum when forward biased, and having a portion of its major face opposite a first deep region defined in (b) unobstructed by any material that will not transmit said photons,
   (b) said second zone defining:
      (i) a first, relatively deep, high conductivity region including a part of said surface and a part of said rectifying junction but spaced from the outer periphery of said junction, and
      (ii) a second, relatively shallow, low conductivity channel region contiguous to and laterally surrounding said first region and including a part of said surface and a part of said junction,
   (c) a first electrical contact to said first region of said second zone,
   (d) a second electrical contact to said first zone and electrically shorting the peripheral portion of said second region of said second zone to said first zone, and
   (e) means attached to said first and second electrical contacts for forward biasing said rectifying junction.

3. A semiconductor device comprising:
   (a) a body of gallium-arsenide having a first zone of one conductivity type and a second zone of an opposite conductivity type extending into said body from a surface thereof and forming a rectifying junction with said first zone, having means for emitting photons in the optical region of the electromagnetic spectrum when forward biased, and having a portion of its major face opposite a first relatively deep region defined in (b) unobscured by any material that will not transmit said photons,
   (b) said second zone defining:
      (i) a first, relatively deep, high conductivity region including first portions of said surface and said junction but spaced from the outer periphery thereof,
      (ii) a second, relatively shallow, low conductivity channel region contiguous to and laterally surrounding said first region and including second portions of said surface and said junction, and
      (iii) a third, relatively deep, high conductivity region contiguous to and laterally surrounding said second region and including a third portion of said surface and the peripheral portion of said junction,
   (c) a first electrical contact to said first region of said second zone,
   (d) a second electrical contact covering said peripheral portion of said junction and electrically shorting said first zone and said third region of said second zone, and
   (e) means attached to said first and second electrical contacts for forward biasing said rectifying junction.

4. A device according to claim 3 wherein said first region has a circular configuration, said second and said third regions have an annular configuration, and said second electrical contact defines an annular metallic electrode.

5. A device according to claim 1 wherein said first zone is n-type conductivity and said second zone is p-type conductivity.

6. A two-terminal semiconductor device comprising:
   (a) a body of gallium-arsenide having a first zone of one conductivity type and a second zone of an opposite conductivity type contiguous to and forming a rectifying junction with said first zone, and having means for emitting photons in the optical region of the electromagnetic spectrum when forward biased,
   (b) said second zone defining a first, deep, low resistivity inner region spaced from the periphery of said rectifying junction and forming an active rectifying junction with said first zone, and a second, shallow, high resistivity region laterally surrounding and separating said first region from said periphery and forming a relatively inactive rectifying junction with said first zone,
   (c) a first electrical contact connected to said first zone and a second electrical contact connected only to said first region of said second zone, said second electrical contact being positive with respect to said first electrical contact such that a forward bias is impressed across said active junction, and
   (d) a portion of the major face of said body of gallium-arsenide opposite said active rectifying junction being unobstructed by any material that will not transmit said photons, whereby said second shallow, high resistance region alleviates degradation problems with said body and improves linearity of emission of photons with respect to the variable of time and degree of forward biasing.

7. A two-terminal semiconductor device comprising:
   (a) a body of gallium-arsenide having a first zone of one conductivity type and a second zone of an opposite conductivity type extending into said body from a surface thereof, and contiguous to and forming a rectifying junction with said first zone, and having means for emitting photons in the optical region of the electromagnetic spectrum when forward biased,
   (b) said second zone defining:
      (i) a first, relatively deep, high conductivity inner region including portions of said surface and said rectifying junction but spaced from the outer periphery of said junction and forming an active rectifying junction unit with said first zone, and (ii) a second, relatively shallow, low conductivity region contiguous to and laterally surrounding said first region which includes portions of said surface and said rectifying junction and is terminated at its outer periphery by the periphery of said junction and forming a relatively inactive rectifying junction with said first zone, (c) a first electrical contact connected to said first zone, (d) a second electrical contact connected only to said first region of said second zone, said second electrical contact being positive with respect to said first electrical contact, such that a forward bias is impressed across said rectifying junction, effecting emission of photons in said optical region of said electromagnetic spectrum, and (e) a portion of the face of said body of gallium-arsenide opposite said first region being unobstructed by any material that will not transmit said emitted photons, whereby said second relatively shallow, low conductivity channel region alleviates degradation of the photon emitting properties of said body and improves linearity of emission of photons with respect to time and the degree of forward biasing.

8. A device according to claim 6 wherein said first region has a circular configuration and said second region has an annular configuration.

9. A device according to claim 6 wherein said first zone is n-type conductivity and said second zone is p-type conductivity.

10. A device according to claim 7 wherein said peripheral junction portion intersects said surface, and each of said pair of terminals is connected to said surface.

11. A device according to claim 10 wherein said one of said terminals defines an annular electrode surrounding said peripheral junction portion in spaced relation therefrom.

12. A semiconductor device, comprising:
(a) a body of Group III–Group V semiconductor compound having a first zone of one conductivity type and a second zone of an opposite conductivity type contiguous to and forming a rectifying junction with said first zone, and having means for emitting photons in the optical region of the electromagnetic spectrum when forward biased, (b) said second zone defining a first, inner, relatively deep, low resistivity region spaced from the periphery of said rectifying junction and a second, shallow, high resistivity region laterally surrounding said first region and separating said first region from said periphery, (c) means attached to said first zone and only to said first region in said second zone, effecting forward biasing of said rectifying junction, and emission, from said body, of said photons in said optical region of the electromagnetic spectrum, (d) a portion of the major face of said body opposite said first region being unobstructed by any material that will not transmit photons, whereby said second high resistance region alleviates adverse degradation of the photon emitting property of said portion of said surface of (d) and induces a more nearly linear emission of photons in proportion to degree of forward biasing across said junction.

13. A semiconductor device, comprising:
(a) a body of Group III–Group V semiconductor compound having a first zone of one conductivity type and a second zone of opposite conductivity type contiguous to and forming a rectifying junction with said first zone, and having means for emitting photons in the optical region of the electromagnetic spectrum when forward biased, (b) said second zone defining:
(i) a first inner relatively deep region,
(ii) a second outer relatively shallow channel region contiguous to and laterally surrounding said first relatively deep region,
(iii) a third relatively deep region contiguous to and laterally surrounding said second relatively shallow channel region, wherein said first and third regions have much lower electrical resistivities than said second region, (c) a first electrical contact to said first relatively deep region of said second zone, and (d) a second electrical contact to said first zone and electrically shorting said third region of said second zone to said first zone, said body having the major face opposite said first relatively deep region unobstructed by any material that will not transmit said photons.

14. A semiconductor device which is capable of emitting light in the optical region consisting essentially of:
(1) a gallium-arsenide wafer having a first monocystalline region of one conductivity type,
(2) a second monocrystalline region of opposite conductivity type forming a rectifying junction with said monocrystalline region, said second monocrystalline region having an inner high conductivity zone a few tenths of a mil in thickness forming an active rectifying junction with said first monocrystalline region and an outer low conductivity zone a few hundredths of a mil in thickness laterally surrounding and contiguous with the inner high conductivity zone and forming an inactive junction with said first monocrystalline region,
(3) a conductor ohmically contacting said second monocrystalline region only at said inner high conductivity zone,
(4) a second conductor ohmically contacting said first monocrystalline region at an area that does not obscure light emitted from said active junction,
(5) said wafer having the part of its major face opposite said second monocrystalline region and said active junction unobscured by any material that is not transparent to said emitted light.
(6) said semiconductor device having means for emitting photons in the optical region of the electromagnetic spectrum when said rectifying junction is forward biased,
(7) and means connected to said conductors for forward biasing said rectifying junction.

15. A device according to claim 7 wherein said peripheral junction intersects only edges perpendicular to said surface and because of the low conductivity, minimizes flow of surface current which adversely affects the properties of said device with respect to emission of said photons.

References Cited
UNITED STATES PATENTS

| | | | |
|---|---|---|---|
| 2,980,830 | 4/1961 | Shockley | 317—235 |
| 3,102,201 | 8/1963 | Braunstein | 250—199 |
| 3,154,692 | 10/1964 | Shockley | 317—234 |
| 3,200,259 | 8/1965 | Braunstein | 307—88.5 |
| 3,214,654 | 10/1965 | Armstrong et al. | 317—237 |
| 3,226,612 | 12/1965 | Haenichen | 317—234 |
| 3,229,104 | 1/1966 | Rutz | 250—211 |
| 3,243,669 | 3/1966 | Sah | 317—234 |
| 3,245,002 | 4/1966 | Hall | 331—94.5 |
| 3,248,669 | 4/1966 | Dumke et al. | 331—94.5 |
| 3,265,990 | 8/1966 | Burns et al. | 331—94.5 |
| 3,293,513 | 12/1966 | Baird et al. | 317—237 |

JOHN W. HUCKERT, *Primary Examiner.*

J. R. SHEWMAKER, *Assistant Examiner.*